United States Patent [19]

Lindemann

[11] 4,339,552
[45] Jul. 13, 1982

[54] VINYL ESTER AQUEOUS ADHESIVE EMULSIONS INCLUDING ACRYLAMIDE

[75] Inventor: Martin K. Lindemann, Greenville, S.C.

[73] Assignee: National Starch & Chemical Corporation, Bridgewater, N.J.

[21] Appl. No.: 943,169

[22] Filed: Sep. 18, 1978

[51] Int. Cl.³ ............................................. C08L 29/04
[52] U.S. Cl. ..................................... 524/459; 524/503
[58] Field of Search ..................... 260/29.6 H, 29.6 E, 260/29.6 TA, 29.6 WA

[56] References Cited

U.S. PATENT DOCUMENTS

| | | | |
|---|---|---|---|
| 3,577,376 | 5/1971 | Lanthier | 260/29.6 E |
| 3,632,787 | 1/1972 | Wilbur | 260/29.6 TA |
| 3,692,723 | 9/1972 | Kasagi | 260/29.6 E |
| 3,755,237 | 8/1973 | Isaacs | 260/29.6 TA |
| 4,001,158 | 1/1977 | Lindemann | 260/29.6 TA |
| 4,035,329 | 7/1977 | Wiest | 260/29.6 WA |
| 4,115,306 | 9/1978 | Lindemann | 260/29.6 TA |
| 4,118,356 | 10/1978 | Devona | 260/29.6 TA |

Primary Examiner—Paul R. Michl
Attorney, Agent, or Firm—Dressler, Goldsmith, Shore, Sutker & Milnamow, Ltd.

[57] ABSTRACT

Aqueous adhesive emulsions based on aqueous emulsion copolymers of vinyl esters, such as vinyl acetate, with ethylene in the presence of an hydroxy functional protective colloid, are provided with increased gel content which provides superior resistance to cold flow and improved adhesion, by the inclusion in the copolymer of a monoethylenic amide monomer, especially acrylamide.

5 Claims, No Drawings

VINYL ESTER AQUEOUS ADHESIVE EMULSIONS INCLUDING ACRYLAMIDE

DESCRIPTION

1. Technical Field

The present invention relates to vinyl ester aqueous emulsion adhesives which possess increased gel content and develop improved resistance to cold flow both before and after baking, especially using copolymers of vinyl acetate with ethylene.

In the aqueous emulsion adhesives under consideration, the adhesive characteristic is supplied by the combination of an emulsion copolymer stabilized in the emulsion by an hydroxy functional protective colloid, especially polyvinyl alcohol or hydroxyl ethyl cellulose, as the essential agents stabilizing the emulsion. Specifically, anionic and nonionic surfactants should not be present as the primary emulsifier, though small amounts of such agents for ancillary purpose, such as reducing surface tension, may be used.

2. Background Art

Adhesives of the type under consideration are known, as illustrated for example in U.S. Pat. No. 3,708,388, in which I am a coinventor. However, these prior adhesives lack good resistance to cold flow, and the adhesion to substrates such as treated polyethylene is poor, which limits the utility of the adhesive. Also, urea formaldehyde condensates have been added to improve cold flow resistance, but residual formaldehyde can create objection.

In U.S. Pat. No. 3,708,388 it was found that when monomers providing thermosetting capacity were present, instead of protective colloids, such as polyvinyl alcohol or hydroxy ethyl cellulose, that the adhesive quality was impaired. Further, if monomers providing thermosetting capacity are present during the emulsion copolymerization, together with the hydroxy functional protective colloid, then it is found that the curing reaction between the N-methylol group and the hydroxy group takes place during the polymerization. This produces excessive emulsion viscosities and, at times, produces a cheesy or gel-like emulsion which is useless.

In order to overcome this difficulty, I included in the copolymer a small proportion of a monomer carrying an N-methylol group which had been etherified, and especially an etherified N-methylol allyl carbamate. These etherified monomers, for a variety of reasons, copolymerized without premature reaction with the hydroxy groups of the hydroxy functional protective colloid so that excessive viscosity in the aqueous emulsion is avoided at the same time that the curing potential is retained. This contribution is the subject of my U.S. Pat. No. 3,941,735 issued Mar. 2, 1976.

While the use of etherified N-methylol functional reactive monomers, as illustrated in U.S. Pat. No. 3,941,735, represents a significant improvement, there are some disadvantages. First, instead of using an easily available monomer, one must methylolate the monomer and then etherify it, and each step in the chain adds cost. Also, N-methylol ethers are subject to transetherification, and this is itself a source of undesired premature cross-linking.

DISCLOSURE OF INVENTION

In the present invention, it is found that the inclusion of a monoethylenically unsaturated amide monomer, which has the

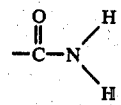

group, such as acrylamide, methacrylamide, crotonamide itaconic acid monoamide, or maleic acid monoamide, in an amount of from 0.2–2.0%, preferably from 0.5–1.2% of the weight of ethylene-vinyl ester monomers being subjected to aqueous emulsion copolymerization in the presence of the hydroxy functional protective colloid, provides a copolymer with minimal premature cross-linking. At the same time, and when the colloid-containing latex is used as an adhesive, improved adhesion to various surfaces is obtained. Also, it appears that ammonia is liberated as the

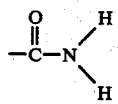

groups react with themselves and there is an increase in the insolubility of the dried adhesive film which improves the water resistance of the adhesive, especially when acrylamide is used. Also, the gel content is increased significantly in comparison with the same system in which the amide monomer is omitted. The increased gel content leads to greater resistance to cold flow, and this is obtained both before and after baking.

Curiously, these reactive monomers do not require blocking, but nonetheless cure in the adhesive film to provide a more insoluble adhesive. The cure is insignificant at room temperature, but it can become useful when a moderate bake is used, e.g., a temperature of at least about 280° F. for 5 minutes.

Referring more particularly to the hydroxy-functional protective colloid, these have been illustrated hereinbefore and are employed in an amount of about 0.05 to 10%, preferably from 0.1 to 5%, and most preferably from 0.5–2.5%, based on the total weight of the latex.

The vinyl ester which is used is preferably vinyl acetate, but all of the vinyl esters with saturated aliphatic monocarboxylic acids are useful, vinyl propionate, vinyl stearate and vinyl versatate further illustrating the class under consideration. At least 40% of the copolymer, preferably at least 55% of the copolymer, will consist of vinyl ester, preferably vinyl acetate.

The vinyl ester may constitute the entire balance of the copolymer aside from the amide monomer conferring curing capacity. A copolymer having a $T_g$ above 10° C. and containing in excess of 80% by weight of vinyl acetate with less than 20% of other monomers can be used to provide excellent adhesives for wood, with the acrylamide providing cure for desired water resistance. Plasticizers, such as dibutyl phthalate, are added to the emulsion for this purpose.

On the other hand, it is frequently desired to include in the copolymer from 5–40%, preferably from 20–40% of ethylene, based on the weight of the copolymer.

Ethylene is of significance in the development of the desired adhesive characteristic in many instances, e.g., for the lamination of plastic films, such as polyvinyl chloride, to paper or wood. While the ethylene can be omitted or replaced, this invention has especial applicability to vinyl ester-ethylene copolymers. These are also of especial value for carpet backing, where water resistance is particularly desired.

If the ethylene component is to be replaced, a maleate or fumarate ester containing from 2–18 carbon atoms in the ester group can be used, such as dibutyl maleate, monobutyl maleate or dipropyl fumarate, and the like. These esters, if used, would be employed in an amount of 5–60%, preferably from 20–50%, based on the weight of the copolymer.

As will be evident, monoethylenic monomers lacking functional groups reactive with hydroxy groups under the conditions of polymerization are broadly useful as a class, the flexibilizing monomers noted hereinbefore being preferred, especially ethylene. In some instances, increased hardness is desired, and this can be obtained by using from 5–30% of monomers such as vinyl chloride or vinyl benzoate. Reactive monomers, other than the monomer providing the

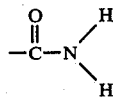

group, which may be present are illustrated by allyl alcohol, 2-hydroxy ethyl acrylate or methacrylate, or the like, or monomers providing the carboxyl group. Monoethylenic carboxylic acids are illustrated by acrylic, methacrylic, crotonic or itaconic acids, or the like. Sulphonic acids, or their salts, such as 2-sulpho ethyl methacrylate or sodium vinyl sulphonate are also useful.

An allyl or methallyl carbamate may also be present and these may include ether groups between the allyl group and the carbamate group. These ethers can be provided by reacting the allyl alcohol with an alkylene oxide, such as ethylene oxide, before converting the resulting alcohol to the carbamate. Allyl carbamate is the preferred carbamate. These are more fully described in my companion application.

The emulsion copolymerization is a conventional one and the details thereof form no part of this invention except that the polymerization is carried out in an aqueous acidic environment having a pH of about 5.7 or lower, preferably in the range of 4.5–5.8. This is conveniently done by adding a small amount of an acid which is preferably a mineral acid such as hydrochloric acid or phosphoric acid. Sodium benzoate or sodium bicarbonate can be added as a buffer. The final emulsion is also acidic, usually pH about 4–5, but this is not essential.

The invention is illustrated in the following example.

BEST MODE FOR CARRYING OUT THE INVENTION

Example

The following mixture is charged to a 17 gallon pressure autoclave equipped with agitator and temperature controls:

| Component | Grams |
| --- | --- |
| Water | 15,510 |
| Polyvinyl alcohol (Note 1) | 572 |
| Polyvinyl alcohol (Note 2) | 801 |

(Note 1) polyvinyl acetate 88% hydrolyzed (4% solids aqueous solution has a viscosity of 5 centipoise). The commercial product Gelvatol 20–30 may be used.
(Note 2) polyvinyl acetate 88% hydrolyzed (4% solids aqueous solution has a viscosity of 22 centipoise). The commercial product Gelvatol 20–60 may be used. The Gelvatol products are supplied by Shawinigan Resins Corp., Springfield, Mass.

The above solution is premixed in a vessel equipped with jacket heating and agitation. The water is charged to the vessel at room temperature and the two polyvinyl alcohols are added as dry powders with agitation. The mixture is heated to 180° F. and held at this temperature for 2 hours, and the solution is allowed to cool and is then filtered through 4 ply cheesecloth. The resulting solution is then added to the pressure autoclave.

The following materials are then added in sequence to the autoclave:

| Material | Grams |
| --- | --- |
| 1 Acrylamide | 156 |
| 2 Ferrous sulfate (1% aqueous solution) | 4 |
| 3 Phosphoric acid | 10 |
| 4 Vinyl acetate | 26,000 |

The autoclave is then purged to remove oxygen by pressurizing to 20 psig. with nitrogen and then evacuating to 2 psig. This nitrogen purge procedure is repeated once with nitrogen and then twice with ethylene. After the last purge, the autoclave is pressurized with ethylene to 600 psig. and this pressure of ethylene is maintained until about 95% of the vinyl acetate has been consumed in the polymerization reaction.

The polymerization reaction is initiated and maintained by keeping the contents of the autoclave at a temperature of 57° C.±2° C. during the reaction period and by appropriate additions of an oxidant solution and a reductant solution. More particularly, the reaction mixture is maintained in a reducing state by addition of a reductant solution constituted by 300 grams of sodium formaldehyde sulfoxylate in 2,700 grams of water, and the exothermic polymerization reaction is controlled by addition of an oxidant solution constituted by 300 grams of a 30% aqueous solution of hydrogen peroxide diluted with 2,940 grams of water.

The reaction mixture is sampled hourly for pH and total solids content, and whenever the batch solids exceeds 58%, it is diluted with water to 56%. When the unreacted vinyl acetate content drops to 5% of its original amount, the remaining oxidant solution (modified by the addition of 10 grams of t-butyl hydroperoxide) is added to permit the reaction to be completed. This is achieved as follows.

When the proportion of unreacted vinyl acetate has dropped to 2% of its original amount, the autoclave is vented to reduce the pressure to 130 psig., and the contents are then transferred to a pre-evacuated pressure vellel where the temperature is maintained until the vinyl acetate content is less than 0.3% of its original amount. The total solids content is then adjusted with water to 55–57% and 20% aqueous sodium benzoate is added to adjust the pH to 4–4.5. An emulsion having the following properties is obtained.

Solids content = 55.9%
Brookfield Viscosity (60 RPM-#4 spindle) = 2800 cp. at 25° C.
Insolubility in trichloroethylene (12 hr. air dry) = 62.8%
Intrinsic Viscosity (dimethyl formamide) = 2.39 at pH 4.5
$T_g$ (differential thermal calorimetry) = +5° C.
Average particle size = 0.45 micron In the absence of the acrylamide, the air dry insolubility would be about 40%, so the insolubility obtained represents a marked improvement. This insolubility factor is the gel content. The insolubility after baking for 5 minutes at 280° F. is also improved from 63% to 85%.

The result is an adhesive emulsion exhibiting superior adhesion, particularly to cellulosic surfaces, and enchanced gel content providing superior cold flow resistance in adhesive application.

It is desired to stress that polyvinyl alcohol is distinctly superior from the standpoint of an adhesive emulsion and its selection is preferred. In the substantial absence of conventional emulsifying agents, the average particle size is consistently above 0.3 micron. The combination of large particle size and the limited proportion of acrylamide which minimizes undesired polymerization of this water soluble monomer in the aqueous phase of the emulsion, prevents the viscosity of the emulsion from increasing unduly, and this facilitates the achievement of good application characteristics.

As a matter of interest, emulsion copolymers of acrylamide and vinyl acetate have previously been proposed as wood adhesives, as in British Pat. No. 1,092,030. However, the combination of hydroxy functional protective colloid and small proportion of acrylamide used herein is not taught, so excess viscosity results.

What is claimed is:

1. An aqueous adhesive emulsion comprising water having emulsified therein an aqueous emulsion copolymer consisting essentially of at least 5% by weight of ethylene, from 0.2% to 2.0% by weight of acrylamide, and the balance vinyl acetate, the monomers of said copolymer being emulsified during copolymerization by from 0.5% to 10% of polyvinyl alcohol, and said copolymer having a a $T_g$ above 10° C. and containing in excess of 80% by weight of vinyl acetate.

2. An aqueous adhesive emulsion as recited in claim 1 in which said acrylamide is present in an amount of from 0.5-1.2%.

3. An aqueous adhesive emulsion as recited in claim 1 in which said emulsion copolymer has an average particle size of at least 0.3 micron.

4. An aqueous adhesive emulsion as recited in claim 1 in which said emulsion is acidic to about neutral.

5. An aqueous adhesive emulsion as recited in claim 1 in which said polyvinyl alcohol is constituted by polyvinyl acetate hydrolyzed to about 88%.

* * * * *